United States Patent [19]
Bennett et al.

[11] 3,978,645
[45] Sept. 7, 1976

[54] SICKLE GUARD

[75] Inventors: George H. Bennett, Berrien Springs, Mich.; Wilbur L. Pringle, Washington, Ill.

[73] Assignee: National-Standard Company, Niles, Mich.

[22] Filed: June 27, 1975

[21] Appl. No.: 591,160

[52] U.S. Cl. .................................................. 56/310
[51] Int. Cl.² ......................................... A01D 55/10
[58] Field of Search ............................... 56/296–314

[56] References Cited
UNITED STATES PATENTS

| | | | |
|---|---|---|---|
| 2,529,087 | 11/1950 | Leake | 56/310 |
| 3,146,570 | 9/1964 | Otten | 56/311 |
| 3,171,242 | 3/1965 | Scarnato et al. | 56/310 |
| 3,553,948 | 1/1971 | White | 56/307 |
| 3,566,592 | 3/1971 | Jerman et al. | 56/311 |

*Primary Examiner*—Russell R. Kinsey
*Attorney, Agent, or Firm*—Johnson, Dienner, Emrich & Wagner

[57] ABSTRACT

A sickle guard having at least one longitudinally extending guard finger for use in a mower having sickle means including mounting means for supporting flat cutter sections for movement transversely of the guard finger, wherein the guard finger has a bottom body portion having an upper ledger surface lying in a horizontal plane and have cutting edges at each of the sides thereof, trash bar means extending transversely at the rear of the cutting edges of the ledger surface and in which the trash bar means has upper horizontal surface means lying in the horizontal plane of the ledger surfce of the guard finger and having cutting edge means at the forward end thereof, and in which the ledger surface and the upper surface of the trash bar means provide for supporting the cutter sections of the sickle means for movement with respect to the guard finger and in cutting relation to the cutting edges of the ledger surface and the cutting edge means of the trash bar means.

9 Claims, 21 Drawing Figures

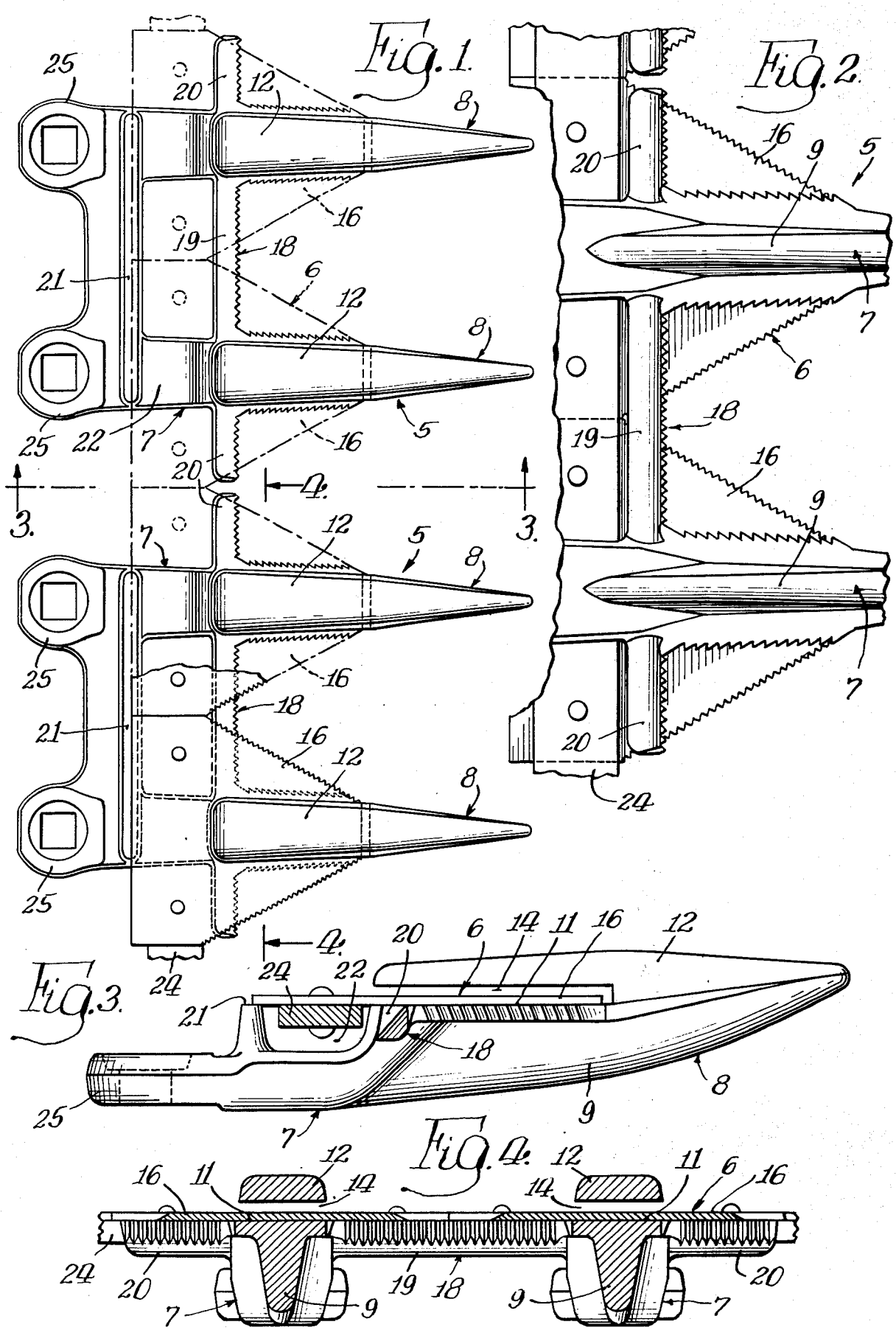

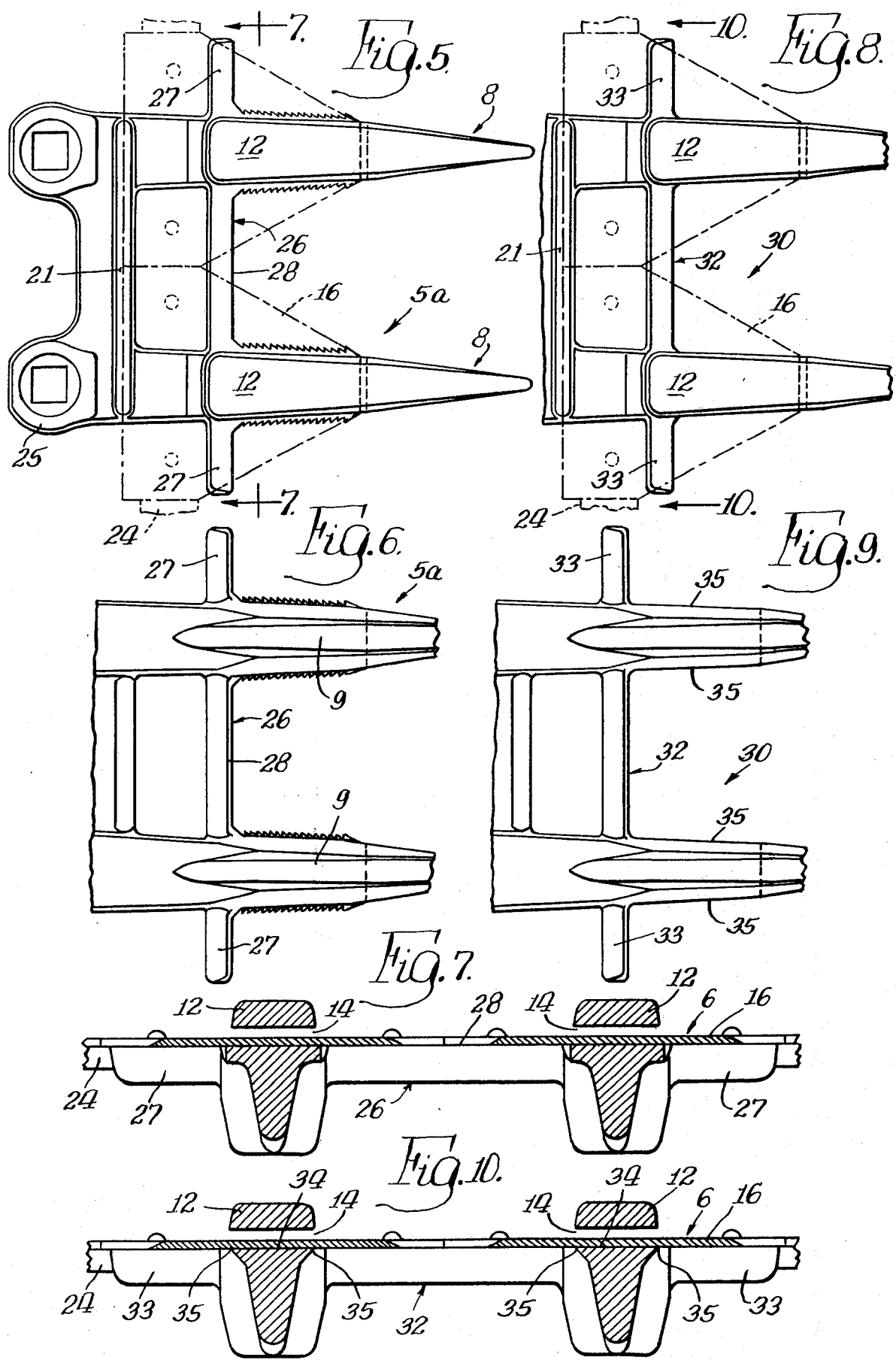

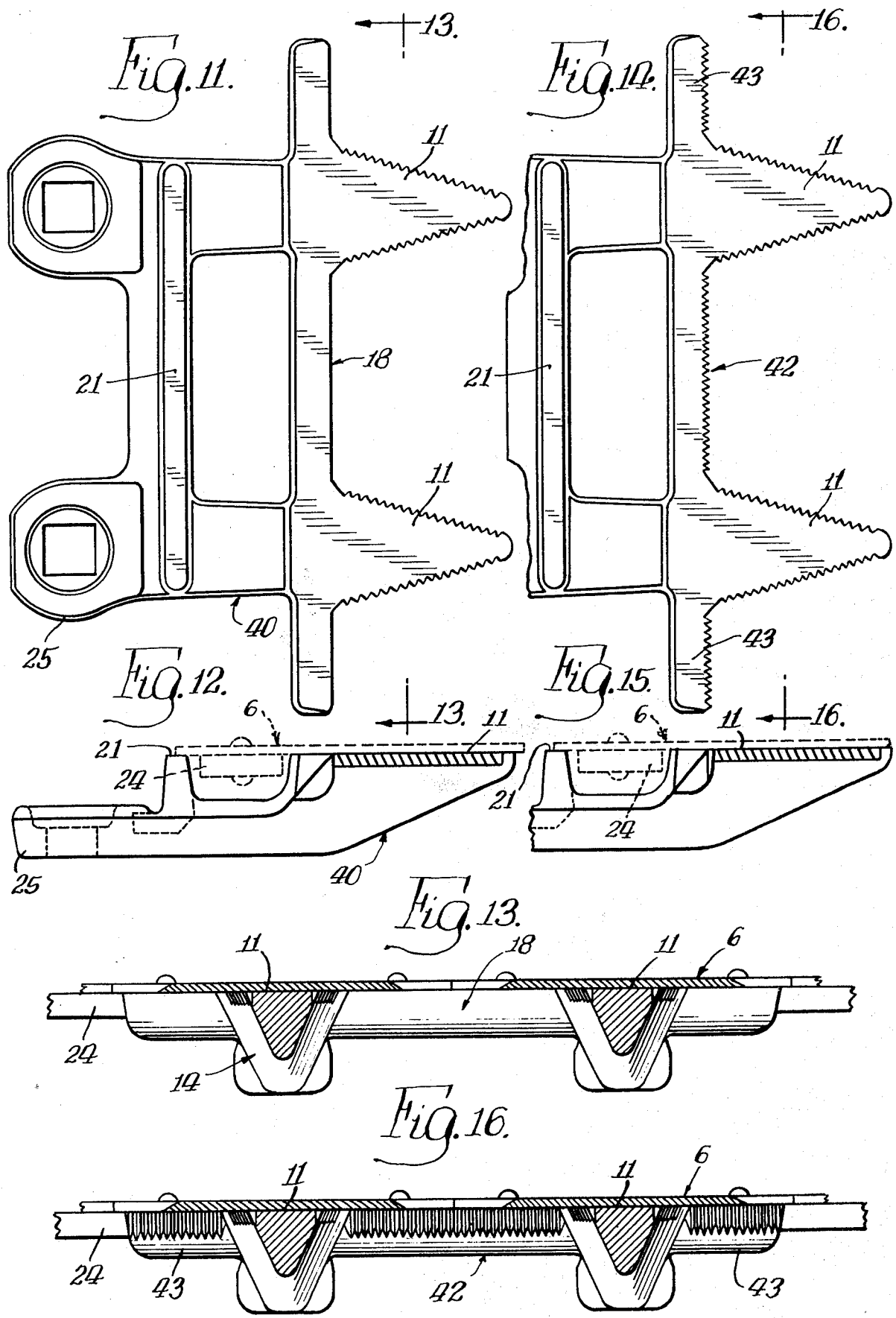

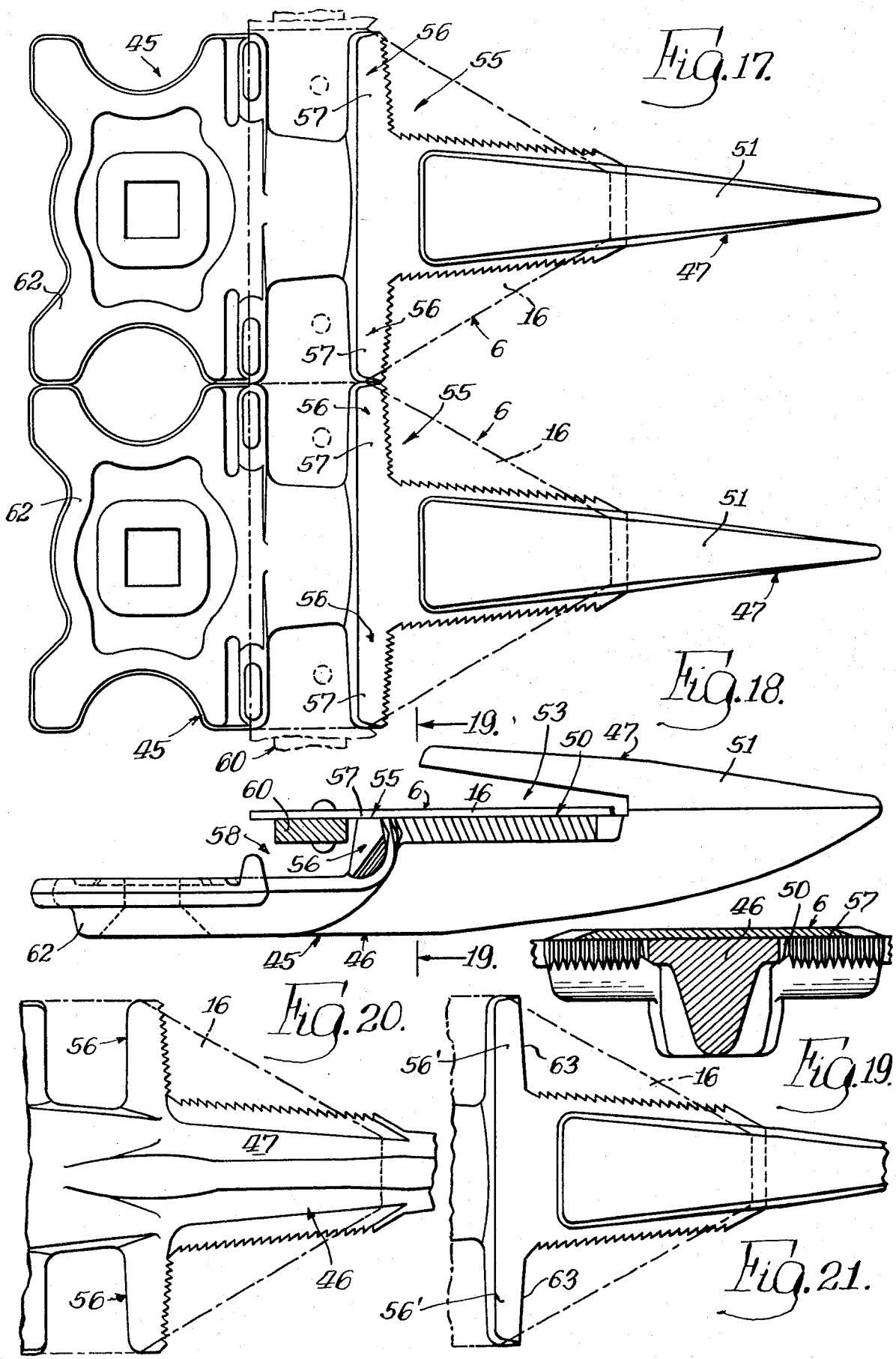

SICKLE GUARD

BACKGROUND OF THE INVENTION

Sickle guards are well known in the art and forged sickle guards are disclosed, for example, in U.S. patents to Mills et al U.S. Pat. No. 2,619,787, dated Dec. 2, 1952, U.S. Pat. No. 2,645,987, dated Oct. 13, 1953, and U.S. Pat. No. 2,319,353 dated Oct. 5, 1955. Also sickle guards representative of the prior art are shown in U.S. Pat. No. 3,566,592 dated Mar. 2, 1971 to Jerman et al, and U.S. Pat. No. 3,553,948 dated Jan. 12, 1971 to White. The last noted patent to White typically shows a guard having horizontally spaced apart guard finger having horizontal ledger surfaces with cutting edges at the sides of each guard finger, trash bar means extending transversely at the rear of the cutting edge of the guard finger, and wear plate means spaced rearwardly of the trash bar means with there being a transverse groove between the trash bar means and the wear plate means in which mounting means for supporting cutter sections of the sickle is disposed, and in which the ledger surfaces and the upper surface of the wear bar means provide for the support of the sickle cutter sections in cutting relation to the cutting edges of the ledger surfaces. In known sickle guards embodying one or more guard finger the upper surface of the trash bar means lies in a plane below the plane of the ledger surface of a single guard finger or the plane of the ledger surfaces of a plurality of guard finger and hence lack a cutting edge for cooperation with the cutter sections in carrying out a cutting operation. It is also known that the cutting edges of the ledger surfaces may be straight or serrated as desired. It is preferable in fabricating a sickle guard to forge a steel plate along the lines disclosed in the aforementioned United States patents to Mills et al.

According to the present invention the sickle guard of the present invention is preferably forged from a steel plate generally along the lines of the aforementioned Mills et al patents except in a manner to provide a parting line to provide a sickle guard in which the upper surface of the trash bar means is disposed so that after machining, the upper surface of the trash bar means and the ledger surface of a guard having a single guard finger lie in a common horizontal plane. In guards of the present invention having more than one horizontally spaced apart guard finger the ledger surfaces thereof and the upper surface of the trash bar means all lie in a common horizontal plane. Further, the sickle guard of the present invention embodies wear plate means having an upper surface lying in the plane of the ledger surface. Further the tine or guard finger of the sickle guards fingers of the invention have cutting edges at the sides thereof and also to provide the forward end of the trash bar means with a cutting edge of the guard to substantially increase the capacity of the guard as compared to known sickle guards. The cutting edges of the ledger surface or surfaces and the trash bar means may be smooth edged or of straight line configuration or, if desired, the side edges of the tine or tines and the forward end of the trash bar means may be serrated, or the cutting edges of the sickle guard may comprise any desired combination of straight and/or serrated cutting edges as desired.

DESCRIPTION OF THE DRAWING

FIG. 1 is a plan view of one embodiment of the invention in which a pair of double tined sickle guards are disposed in side-by-side relation and which are mounted (not shown) in a conventional manner on a mower or other cutting implement with the view being oriented to effect travel of the mower or other implement from left to right as viewed in the drawing in effecting a cutting operation by reciprocation of a conventional sickle illustrated in broken lines in the drawing;

FIG. 2 is a bottom view of a portion of the sickle guard of FIG. 1;

FIG. 3 is a cross sectional view taken substantially along the line 3—3 of FIG. 1 looking in the direction indicated by the arrows;

FIG. 4 is a cross sectional view taken along the line 4—4 of FIG. 1 looking in the direction indicated by the arrows;

FIG. 5 is the plan view of another embodiment of a sickle guard embodying the present invention;

FIG. 6 is a bottom view of the sickle guard of FIG. 5;

FIG. 7 is a cross sectional view taken along the line 7—7 of FIG. 5 looking in the direction indicated by the arrows;

FIG. 8 is a plan view of still another embodiment of a sickle guard according to the present invention;

FIG. 9 is a bottom view of the sickle guard of FIG. 8;

FIG. 10 is a cross sectional view taken along the line 10—10 of FIG. 8 looking in the direction indicated by the arrows;

FIG. 11 is still another embodiment of a sickle guard according to the present invention with the guard being of a type known as a stub guard;

FIG. 12 is a side elevational view of the guard of FIG. 11;

FIG. 13 is a cross sectional view taken substantially along the line 13—13 of FIG. 11 looking in the direction indicated by the arrows;

FIG. 14 is a plan view of still another embodiment of a sickle guard according to the invention which is also in the category of a stub guard;

FIG. 15 is a side elevational view of a portion of the sickle guard of FIG. 14;

FIG. 16 is a sectional view taken substantially along the line 16—16 of FIG. 14 and looking in the direction indicated by the arrows;

FIG. 17 is a plan view of still another embodiment of the invention in which a pair of single guards each having a guard finger are disposed in side-by-side relation and which are mounted (not shown) in a conventional manner on a mower or other cutting implement;

FIG. 18 is a side elevation view of one of the sickle guards of FIG. 17;

FIG. 19 is a cross-sectional view taken substantially along the line 19—19 of FIG. 18 looking in the direction indicated by the arrows;

FIG. 20 is a bottom view of an intermediate portion of the sickle guard shown in FIG. 18; and FIG. 21 is a plan view of an intermediate portion of still another embodiment of the invention.

DESCRIPTION OF PREFERRED EMBODIMENTS OF THE INVENTION

Referring now to FIG. 1 of the drawings, there is shown a pair of sickle guards 5—5 of the invention disposed in side-by-side relation, together with known reciprocal sickle means 6. Any number of sickle guards 5 may be arranged to provide a desired cutting width. The sickle guard 5 as previously noted, is preferably fabricated by forging a steel plate and comprises an integral body portion 7 having, in the embodiment shown, a pair of horizontally spaced apart longitudinally extending guard fingers 8 having bottom portions 9, which as seen in FIGS. 4 and 5, are each formed with a horizontally extending ledger surface 11. In the fabrication of the guard fingers, the upper body portions 12 are initially integral with the lower body portions 9 which are, as is known, are fabricated to provide horizontal slots 14 to receive the cutter sections 16 of the sickle means 6. In the forging of the guard, transversely extending trash bar means comprising a central portion 19 and lateral extensions 20 are formed at the rear of the ledger surfaces 11 and wear plate means 21 is disposed rearwardly of the central portion 19 of trash bar means 18 with there being a transverse groove 22 between the trash bar means 18 and the wear plate means 21 for receiving, in known manner, mounting means 24 supporting the cutter sections 16 of sickle means 6. The body portion 7 also includes known mounting flanges 25 rearwardly of the wear plate means which have bolt openings for receiving bolts to mount the guard on a mowing machine or other implement.

According to the invention it is important to machine the upper surfaces of the trash bar means 18 and the ledger surfaces 11 so that they lie in a common horizontal plane. It is also an advantage to machine the upper surface of the wear plate means 21 so that its upper surface also lies in the horizontal plane of the upper surface of the trash bar means and the ledger surfaces of the tines. The lateral extensions 20 of adjacent guards form or define continuations of the trash bar means between adjacent guards. The side edges of the ledger surfaces and the forward edge of the trash bar means have cutting edges for cooperation with the cutting edges of the cutter sections of the sickle means. The cutting edges of the ledger surfaces, trash bar means and the cutting edges of the sickle cutter members thus provide upon reciprocation of the sickle means for cutting action with respect to material to be cut.

Thus it will be seen that the pair of guard fingers of the sickle guards 5 are provided with outer side cutting edges extending from the leading cutting edges of the lateral extensions 20 of the trash bar means to the outer ends of the ledger surface and inner side cutting edges extending from the cutting edge of the central portion of the trash bar means to the outer ends of the ledger surfaces.

The aforedescribed construction provides for a continuous cutting action with little or no clogging and the material also can be cut along the front edge of the trash bar means. Also increased bearing surface is provided for the sliding sickle cutter sections and consequently a longer wearing guard. It has been found that serrated cutting edges provide a more positive cutting action than a smooth edge and prevent any bunching of the material in the corners between the edges of the ledger surfaces and the trash bar means. The positive cutting action aforenoted prevents the sickle blade from pushing backwardly and erroding the wear bar means which again provides a longer life of the satisfactory operation of the guard. Serrated cutting edges also allow deeper penetration of case hardening and provide a longer life for the cutting edges.

In the embodiment of FIGS. 5 through 7, the sickle guard 5a there shown is the same in major respects as the sickle guard of FIGS. 1 through 4, except that in the sickle guard of FIGS. 5, 6 and 7, the trash bar means 26 and its lateral extensions 27 are provided at their forward edges with plain cutting edges 28 and are not serrated as in the embodiment of the invention first described. In all other respects the sickle guard of FIGS. 5 through 7 are the same as that of FIGS. 1 through 4 and like reference numerals indicate like or similar portions of the guard.

Referring now to FIGS. 8 through 10, the sickle guard 30 there shown is in most respects similar to the guard of the previously described embodiments of the invention. In this instance the trash bar means 32 and the lateral extensions 33, as in the embodiments of FIGS. 5 through 7, are provided with plain cutting edges at the forward ends thereof and the side edges of the ledger surfaces 34 are formed with straight cutting edges 35. In all other respects the guard of FIGS. 8 through 10 is as aforedescribed.

In connection with the sickle guard of FIG. 11 to 13, it includes a body portion 40, the same in all respects as the body portion of the embodiment of the invention shown in FIGS. 1 through 4, except that it lacks the upper body portion 12 of the latter figure so as to provide a so-called stub guard. Here again, the ledger surfaces 11, th upper surface of the trash bar means 18 and the upper surface of the wear plate means 21 all lie in a common horizontal plane and in this instance only the outer edges of the ledger surfaces are provided with cutting edges which may as shown be serrated.

In the sickle guard of FIGS. 14 through 16 it is directed to another form of a stub guard and as before includes trash bar means 42 and lateral projections 43—43 and in all other respects is similar to that of the guard shown in FIGS. 1 through 4. In FIGS. 14 through 16 the trash bar means 42 at the forward end thereof is provided with cutting edges which are serrated in the same manner as in FIGS. 1 through 4.

Referring now to FIGS. 17 through 20 the present invention is shown embodied in a sickle guard 45 having a single guard finger. The sickle guard 45 again is preferably fabricated by forging a steel plate and comprises an integral body portion 46 having a longitudinally extending guard finger 47 having a bottom portion 48 which as seen in FIGS. 18 and 19 is formed with a horizontally extending ledger surface 50, and an upper portion 51. In the fabrication of the guard 45 the upper body portion 51 is initially integral with the lower body portion 48 which as is known is fabricated to provide a horizontal slot 53 to receive the cutter section 16 of sickle means 6 as described in connection with the embodiment of FIGS. 1 through 4. In the forging of the guard 45, trash bar means 55 is defined by extensions 56 extending laterally outwardly of the rear of ledger surface 50 and have upper horizontal surface 57—57 lying in the plane of the ledger surface 50. A transverse groove 58 lies rearwardly of the trash bar means 55 for receiving, in known manner, mounting means 60 supporting the cutter sections 16 of sickle means 6. The body portion 46 also includes a known mounting flange 62 rearwardly of the guard for receiving a bolt to mount the guard on a mowing machine or other implement.

In the present embodiment of the invention the upper surfaces of lateral extensions 56 of the trash bar means 55 and the ledger surface 50 are machined so as to lie in a common horizontal plane. The side edges of the ledger surface 50 and the forward edges of the lateral extension 56 having cutting edges for cooperation with the cutting edges of the cutter section of the sickle means to provide upon reciprocation of the sickle means for cutting action with respect to material to be cut.

The outer and inner side cutting edges of the ledger surface extend from the leading cutting edge of the lateral extensions 56 of the trash bar means 55 to the outer end of the ledger surface.

As before noted the above described construction provides a continuous cutting action with little or no clogging and the material is cut along the front edge of the lateral extensions 56 of the trash bar means 55. Also the ledger surface 50 and the upper surfaces of the lateral extensions provide a bearing surface for the sliding sickle cutter sections. Further in the above embodiment of the invention the cutting edges of the ledger surface 50 and the cutting edges of the lateral extensions 56 are serrated to provide a positive cutting action.

The embodiment of the invention shown in FIG. 21 is in all respects the same as described in connection with FIGS. 17 through 20 except that the cutting edge 63 at the forward ends of the lateral extensions 56' —56' are smooth and not serrated.

It will be understood that various modifications and rearrangements may be made in regard to the present invention without departing from the spirit and scope of the invention.

We claim:

1. In a unitary forged sickle guard having at least one longitudinally extending guard finger for use in a mower having sickle means including:
    mounting means for supporting flat cutter sections for movement transversely of said guard finger, wherein said guard finger has a bottom body portion having an upper ledger surface, the ledger surface of said guard finger lying in a horizontal plane and having cutting edges at each of the sides thereof,
    trash bar means extending at the rear of said cutting edges of said ledger surface, said trash bar means having a machined upper horizontal surface means lying in said horizontal plane of said ledger surface and having cutting edge means provided by the machining of said trash bar means at the forward portion thereof, said cutting edges of said ledger surface and said trash bar means being integral thereto to provide a continuous cutting edge, and
    wear plate means extending transversely of said guard finger rearwardly of said trash bar means, said wear plate means having an upper surface lying in the plane of said ledger surface, said ledger surface and said upper horizontal surface means of said trash bar means and said upper surface of said wear plate means providing support for the cutter sections of the sickle means for movement with respect to said guard finger and in cutting relation to said cutting edges of said ledger surface and the cutting edge means of said trash bar means.

2. The sickle guard of claim 1 in which the cutting edges of said ledger surfaces are serrated.

3. The sickle guard of claim 2 in which the cutting edge means of said trash bar means is serrated.

4. The sickle guard of claim 1 in which said guard finger comprises an upper body portion overlying said lower body portion and having a slot therebetween in which the cutter section of said sickle is adapted to be disposed.

5. The sickle guard of claim 1 in which said trash bar means is defined by end portions disposed laterally outwardly of the sides of the ledger surface.

6. The sickle guard of claim 5 in which said cutting edges of said end portions are serrated.

7. In a unitary forged sickle guard having at least a pair of horizontally spaced apart longitudinally extending guard fingers for use in a mower having sickle means including:
    mounting means for supporting flat cutter sections for movement transversely of said guard fingers, wherein said guard fingers each have a bottom body portion having an upper ledger surface, the ledger surfaces of said guard fingers lying in a common horizontal plane and having cutting edges at each of the sides thereof,
    trash bar means extending at the rear of said cutting edges of said ledger surfaces, said trash bar means having a machined upper horizontal surface lying in said common horizontal plane of said ledger surface and having cutting edge means provided by the machining of said trash bar means at the forward portion thereof said cutting edges of said ledger surface and said trash bar means being integral thereto to provide a continuous cutting edge, and
    wear plate means extending transversely of said guard fingers, said wear plate means having an upper surface lying in the plane of said ledger surfaces,
    said ledger surfaces and said upper horizontal surface of said trash bar means along with said upper surface of said wear plate means providing support for the cutter sections of the sickle means for movement with respect to said guard fingers and in cutting relation to said cutting edges of said ledger surfaces and the cutting edge means of said trash bar means.

8. The sickle guard of claim 7 in which said sickle guard includes a transversely extending groove between said trash bar means and said wear plate means for receiving the mounting means of said sickle means and said trash bar means is defined by end portions disposed laterally outwardly of the sides of the ledger surfaces.

9. The sickle guard of claim 1 in which the cutting edges of said ledger surfaces and the cutting edge means of said trash bar means are serrated.

* * * * *

Disclaimer 3,978,645.—*George H. Bennett,* Berrien Springs, Mich.; and *Wilbur L. Pringle,* Washington, Ill. SICKLE GUARD. Patent dated Sept. 7, 1976. Disclaimer filed July 9, 1986, by the assignee, *National Standard Co.*

Hereby enters this disclaimer to claims 1, 4, 5, 7 and 8 of said patent.
[*Official Gazette October 14, 1986.*]